United States Patent
Pan et al.

(10) Patent No.: US 10,567,300 B2
(45) Date of Patent: Feb. 18, 2020

(54) LAYER 3 FAIR RATE CONGESTION CONTROL NOTIFICATION

(71) Applicant: Cisco Technology, Inc., San Jose, CA (US)

(72) Inventors: Rong Pan, Saratoga, CA (US); Parvin Taheri, San Jose, CA (US); Thomas J. Edsall, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 15/820,716

(22) Filed: Nov. 22, 2017

(65) Prior Publication Data
US 2019/0158415 A1    May 23, 2019

(51) Int. Cl.
| | |
|---|---|
| *H04L 12/863* | (2013.01) |
| *H04L 12/865* | (2013.01) |
| *H04L 12/851* | (2013.01) |
| *H04L 12/26* | (2006.01) |
| *H04L 29/08* | (2006.01) |

(52) U.S. Cl.
CPC .......... *H04L 47/6255* (2013.01); *H04L 47/50* (2013.01); *H04L 47/6275* (2013.01); *H04L 43/16* (2013.01); *H04L 47/2441* (2013.01); *H04L 67/1097* (2013.01)

(58) Field of Classification Search
CPC ..... H04L 47/6255; H04L 47/26; H04L 47/30; H04L 47/50; H04L 47/6275
See application file for complete search history.

(56) References Cited

U.S. PATENT DOCUMENTS

| | | | |
|---|---|---|---|
| 4,912,661 A | * | 3/1990 | Potter .................... G01P 3/44 702/147 |
| 8,407,364 B2 | | 3/2013 | Prabhakar et al. |
| 9,065,795 B2 | | 6/2015 | Prabhakar et al. |

(Continued)

OTHER PUBLICATIONS

A. Kabbani, et al., "AF-QCN: Approximate Fairness with Quantized Congestion Notification for Multi-tenanted Data Centers", 2010 IEEE 18th Annual Symposium on High Performance Interconnects (HOTI), Aug. 18-20, 2010, Mountain View, CA, 8 pages.

(Continued)

*Primary Examiner* — Walter J Divito
*Assistant Examiner* — Anthony Luo
(74) *Attorney, Agent, or Firm* — Edell, Shapiro & Finnan, LLC

(57) ABSTRACT

A network device, including ports that receive/send data packets from/to a network, receives data packets of multiple traffic flows, and populates a queue in memory with the data packets. The network device periodically updates a fair rate for the multiple traffic flows to converge a length of the queue to a reference length. Specifically, the network device determines a length of the queue, a change in the length from a previous length, and a deviation of the length from the reference length. The network device detects an increase in the change in length above a threshold that is based on the reference length. If the increase is not above the threshold, the network device derives the fair rate from a previous fair rate using proportional integral control. The network device identifies elephant flows among the multiple traffic flows, and sends the fair rate to a source of each elephant flow.

20 Claims, 8 Drawing Sheets

(56) References Cited

U.S. PATENT DOCUMENTS

| | | | |
|---|---|---|---|
| 9,614,765 B2 | 4/2017 | Calavrezo et al. | |
| 2007/0280245 A1* | 12/2007 | Rosberg | H04L 47/10 |
| | | | 370/392 |
| 2010/0210274 A1* | 8/2010 | Iwai | H04J 13/0062 |
| | | | 455/450 |
| 2013/0124753 A1* | 5/2013 | Ansari | H04L 47/263 |
| | | | 709/235 |
| 2015/0037291 A1 | 2/2015 | Stephenne et al. | |
| 2015/0163142 A1 | 6/2015 | Pettit et al. | |
| 2015/0163144 A1 | 6/2015 | Koponen et al. | |
| 2019/0028382 A1* | 1/2019 | Kommula | H04L 45/125 |

OTHER PUBLICATIONS

Y. Zhu, et al., "Congestion Control for Large-Scale RDMA Deployments", SIGCOMM '15, Aug. 17-21, 2015, London, United Kingdom, 14 pages.

International Search Report and Written Opinion in counterpart International Application No. PCT/US2018/061727, dated Jan. 23, 2019, 9 pages.

Zhang, et al., "Fair Quantized Congestion Notification in Data Center Networks", IEEE Transactions on Communications, vol. 61, No. 11, Nov. 2013, 10 pages.

\* cited by examiner

US 10,567,300 B2

LAYER 3 FAIR RATE CONGESTION CONTROL NOTIFICATION

TECHNICAL FIELD

The present disclosure relates to data rate feedback control in a network.

BACKGROUND

Modern datacenter applications often require networks to provide high throughput and low latency, simultaneously. Unfortunately, traditional Transmission Control Protocol (TCP)/Internet Protocol (IP) stacks implemented in the data center and the network for communications often fail to meet these simultaneous requirements. Remote direct memory access (RDMA) is a promising technology to meet the above challenge; however, RDMA and also storage networks in datacenters, often rely on Priority-based Flow Control (PFC) to enable a drop-free network. PFC can lead to poor performance of applications hosted in the data center due to problems such as head-of-line blocking and unfairness computations. Quantized Congestion Notification (QCN) was introduced and standardized at IEEE 802.1 working group (IEEE 802.1Qau) to solve the limitation of PFC. QCN, however, is an Open System Interconnect (OSI) layer 2-based technology, and in IP-routed datacenters, its application is limited. The industry needs an effective and fast reacting mechanism to provide OSI layer 3 congestion control.

DESCRIPTION OF EXAMPLE EMBODIMENTS

Overview

A network device (e.g., a network switch or a router), having multiple ports configured to receive/send data packets from/to a network, performs a method of layer 3 fair rate congestion control notification (L3FCN). The method includes receiving data packets of multiple traffic flows, populating a queue in memory with the data packets, and periodically updating a fair rate to be applied to ones of the multiple traffic flows to converge a length of the queue to a reference length over time. The updating includes: measuring a length of the queue, computing a change in the length from a previous length, and computing a deviation of the length from the reference length; detecting an increase in the change in length above at least one threshold that is based on the reference length. The updating further includes (i) if the increase is not above the at least one threshold indicative of a sudden and substantial increase in the change in length, deriving the fair rate from a previous fair rate using proportional integral control based on tunable control parameters, and (ii) if the increase is above the at least one threshold, decreasing the previous fair rate to the fair rate using multiplicative decrease control to accelerate convergence relative to the using the proportional integral control. The method also includes periodically identifying elephant flows among the multiple traffic flows, and periodically sending the fair rate to a source of each elephant flow.

Example Embodiments

Figure 1:
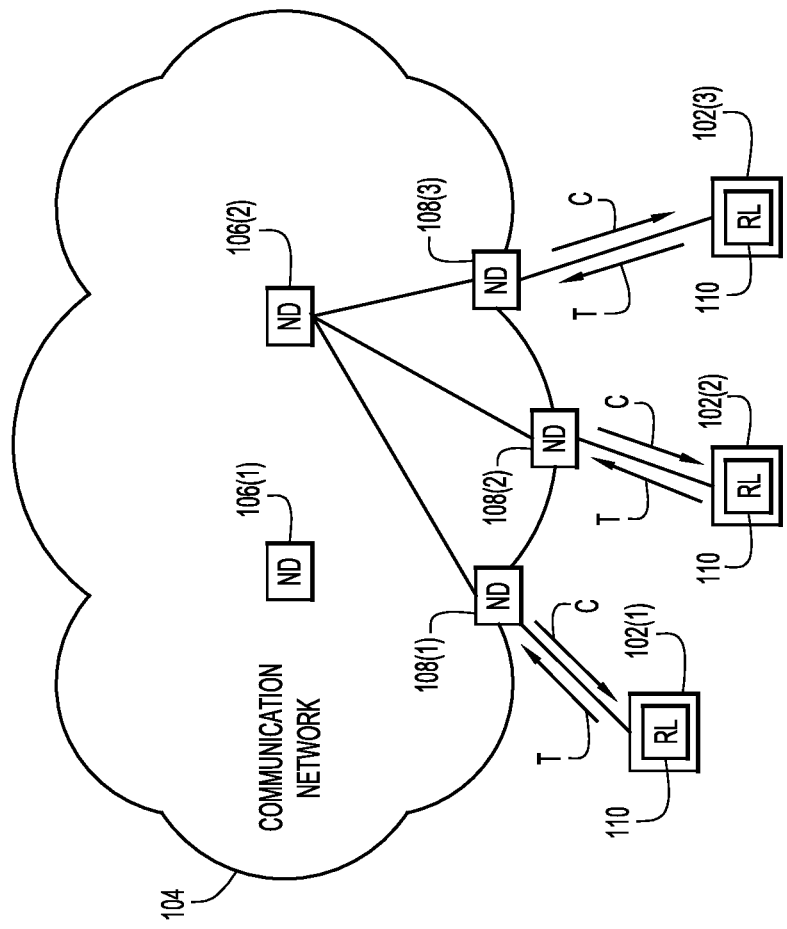
FIG. 1 is a block diagram of a network environment in which embodiments directed to layer 3 fair rate congestion control notification (L3FCN) may be implemented, according to an example embodiment.

With reference to FIG. 1, there is a block diagram of a network environment 100 in which embodiments directed to layer 3 fair rate congestion control notification (L3FCN) may be implemented. L3FCN may also referred to herein more simply as "layer 3 fair rate congestion control" (L3FC). Environment 100 includes endpoint devices 102(1)-102(3) (collectively referred to as "endpoints 102," and singularly referred to as an "endpoint 102") connected to a communication network 104. Communication network 104 may include one or more local area networks (LANs) and one or more wide area networks (WANs) such as the Internet. Communication network 104 includes network devices (NDs) 106(1), 106(2), and 108(1)-108(3), such as routers and/or switches, to route and switch traffic, e.g., data packets in the form of IP packets, traversing the communication network. Endpoints 102 may include server devices (e.g., "servers") hosted in data centers (not shown) and client devices (i.e., "clients") that communicate with each other through network devices 106 in communication network 104, using any known or hereafter developed communication protocol, such as TCP/IP or the like. In the example of FIG. 1, network devices 106(1) and 106(2) may represent spine switches of a leaf-spine network, while network devices 108(1)-108(3) (referred to collectively as "network devices 108," and singularly as a "network device 108") may represent Top-of-Rack (TOR) switches that act as intermediate nodes between endpoints 102 and respective ones of network devices 106(1) and 106(2). It is understood that network environment 100 may include many more endpoints and network devices than are shown by way of example in FIG. 1. Also, network environment 100 may employ any number of different network topologies besides that shown in FIG. 1.

At a high-level, in the example of FIG. 1, network devices 108 (e.g., the TOR switches) each receives multiple traffic flows T as streams of IP packets originating from various traffic sources, such as endpoints 102(1)-102(3), and directs the IP packets to various destinations, such as other endpoints or network devices 106/108 based on 5-tuples in headers of the IP packets. In accordance with embodiments presented herein, each network device 108 performs/imposes data rate control on the received/incoming traffic flows based on a quantitative analysis of one or more dynamically varying packet queues used to store IP packets from the traffic flows temporarily in the network device. This process by which each network device 108 imposes a "fair rate" on each of the received/incoming traffic flows is referred to as L3FCN. According to L3FCN, each network device 108 derives or computes fair rates for the incoming/received traffic flows that feed/populate the packet queues, and then sends indications of the fair rates in fair rate messages C to the sources, such as endpoints 102, from which the traffic flows originate (i.e., to which the fair rates pertain). Endpoints 102 typically include respective rate limiters (RLs) 110 configured to limit the data rates (more simply, "rates") at which the endpoints send/transmit their respective traffic in response to the fair rates indicated in messages C. Alternatively, if endpoints 102 do not have the capability to perform rate control/limiting, a destination switch among ToR switches 108 derives the fair rate and sends the corresponding control messages C to a source ToR among the ToR switches, which imposes the fair rate responsive to the control messages C.

Figure 2:
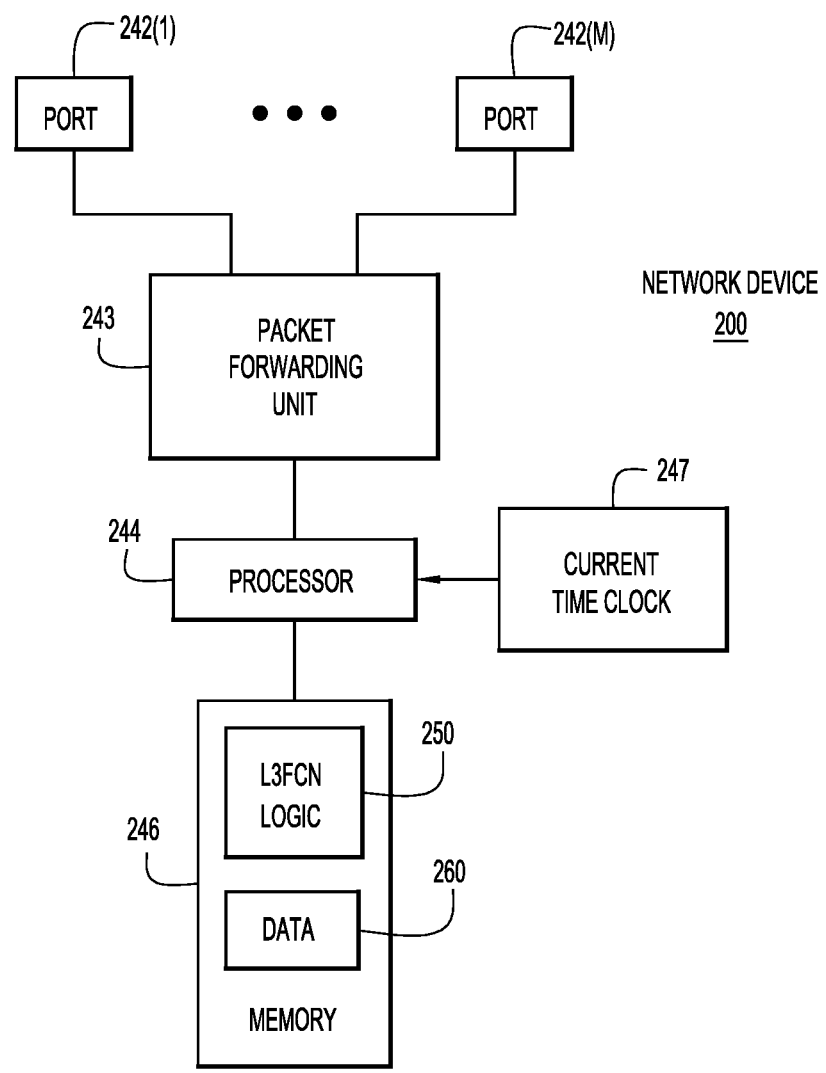
FIG. 2 is a block diagram of a network device configured to implement L3FCN, according to an example embodiment.

With reference to FIG. 2, there is a block diagram of an example network device 200, representative of each of network devices 108, configured to implement L3FCN. Network device 200 comprises a plurality of network input/output (I/O) ports 242(1)-242(M) to send traffic (e.g., IP packets) to a network and receive traffic (e.g., IP packets) to the network, a packet forwarding/processing unit 243, a network processor 244 (also referred to simply as "processor"), a memory 246, and a current time clock 247 configured to provide sub-millisecond time stamps (i.e., time stamps with microsecond resolution) to the ports and/or the network processor for the IP packets received on ports 242(1)-242(M). The packet forwarding/processing unit 243 is, for example, one or more application specific integrated circuits (ASICs) that include packet buffers, packet queues, and other control logic for performing packet forwarding operations. The processor 244 is a microcontroller or microprocessor that is configured to perform higher level controls of switch 106. To this end, the memory 246 stores software instructions that, when executed by the processor 244, cause the processor 244 to perform a variety of operations including operations described herein. For example, the memory 246 stores instructions for L3FCN logic 250 to perform operations described herein including methods 400-700, described below. L3FCN logic 250 may also include logic components in packet forwarding unit 243. Memory 246 also stores data 260 used and generated by logic 250. Such data may include packet queues, queue-related thresholds, fair rates, queue-related parameters, such as length, change in length, and deviation, tunable control parameters, and so on, as will be described below.

As mentioned above, L3FCN, implemented primarily in each network device 108, derives a fair rate for incoming traffic flows. More specifically, L3FCN derives a respective fair rate for each queue in the network device, i.e., on a per queue basis. Multiple traffic flows may feed any given queue, and the traffic flows may include relatively large traffic flows referred to as "elephant flows" and relatively small traffic flows (that are smaller than the elephant flows) referred to as "mice flows," as would be appreciated by one of ordinary skill in the relevant arts. Examples of different sized flows are described below in connection with FIG. 1n an embodiment, for each queue, L3FCN identifies the elephant flows feeding that queue using any known or hereafter developed technique that identifies elephant flows, and then applies the fair rate only to the identified elephant flows, i.e., sends an indication of the fair rate to the endpoints/sources from which the elephant flows originate.

Figure 3:
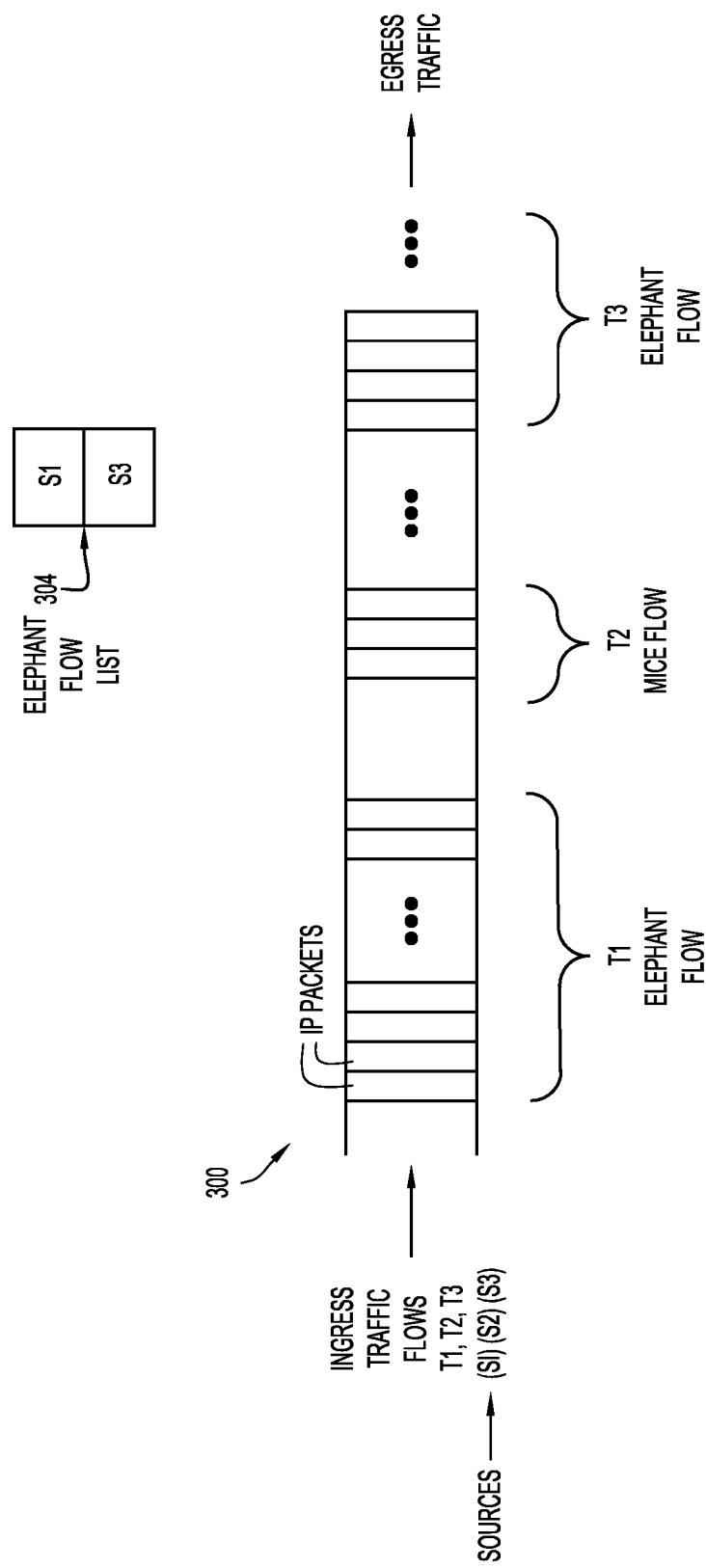
FIG. 3 is an illustration of an output packet queue in the network device, according to an example embodiment.

With reference to FIG. 3, there is an illustration of a queue 300 in network device 108(1), which may include multiple similar queues. Multiple endpoints/sources S1, S2, and S3 originate respective ones of multiple traffic flows T1, T2, and T3, i.e., S1-S3 represent the sources of traffic flows T1-T3. Network device 108(1) receives IP packets from multiple traffic flows T1, T2, and T3 at ingress ports of the network device, and stores the IP packets in queue 300. The IP packets are then fed from queue 300 to egress ports of the network device, hence the queue may be referred to as an "output queue." Network device 108(1) classifies each IP packet into a respective traffic flow based on 5-tuple information in a header of the IP packet, e.g., a source IP address in the header, identifying a source/endpoint (e.g., S1, S2, and so on) from which the IP packet originates. IP packets that originate from the same source are classified into the same traffic flow. Network device 108(1) maintains quantitative statistics based on a number of IP packets that have been received for each traffic flow feeding queue 300. When the quantitative statistics associated with a given traffic flow/source of the traffic flow exceed or rise above a threshold indicative of an elephant flow, network device 108(1) identifies or marks that traffic flow as an elephant flow. In one example, network device 108(1) simply counts IP packets received for a given traffic flow/source of the traffic flow in a given time period, and when the number exceeds a threshold number, the flow is flagged as an elephant flow. According to embodiments presented below, L3FCN derives a respective fair rate for queue 300 (and each other queue in network device 108(1)), and applies the fair rate to at least the elephant flows in the queue. In an embodiment, L3FCN applies the fair rate only to the elephant flows in the queue.

In the example of FIG. 3, queue 300 includes IP packets for elephant flows T1 and T3, and a mice flow T2. Network device 108(1) maintains a list identifying elephant flows for the network device. For example, network device 108(1) maintains a list 304 of sources S1 and S3 (e.g., IP addresses of the endpoints corresponding to sources S1 and S3) of elephant flows T1 and T3 for the network device. L3FCN only applies the fair rate derived for queue 300 to each of elephant flows T1 and T3, e.g., will send an indication of the fair rate back to each of the IP addresses (e.g., S1 and S2) from which the respective elephant flows originated.

Figure 4:
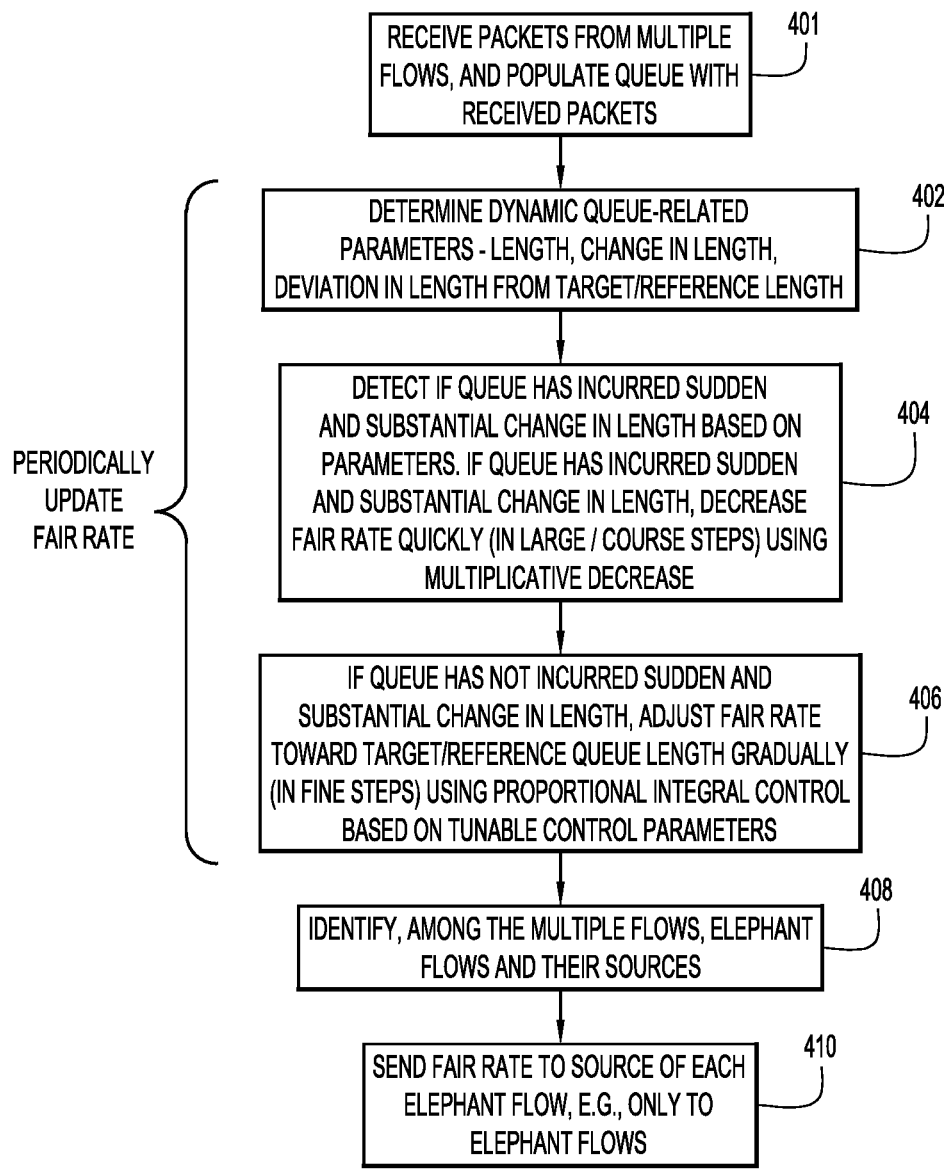
FIG. 4 is a flowchart of a high-level method of L3FCN implemented in the network device, according to an example embodiment.

With reference to FIG. 4, there is a flowchart of an example high-level method 400 of L3FCN. Method 400 may be performed primarily by/at a network device (e.g., network device 108(1)) operating in connection with a rate limiter. The network device includes multiple ports (e.g., ports 242) configured to receive/send data packets (e.g., IP packets) from/to a network.

At 401, the network device receives data packets (e.g., IP packets) of multiple traffic flows and populates a queue (e.g., queue 300) in a memory of the network device with the data packets. That is, the multiple traffic flows share the same queue.

At 402-406 described in detail below, L3FCN periodically updates a fair rate (also denoted as "fairRate") to be applied to/imposed on elephant flows among the multiple traffic flows, to cause a current length of the queue (i.e., a current queue length (Qlen)) to converge to a target or reference queue length (Qref) over time. L3FCN updates the fair rate based on (i) the current queue length (Qlen), (ii) a direction of change of the queue length (i.e., whether the queue length is increasing or decreasing over time as given by Qlen-Qold, where Qold represents a previous queue length), and (ii) a deviation of the queue length from the reference queue length (Qref), given by Qlen-Qref. Updating/adaptation of the fair rate includes two possible phases based on the aforementioned quantities: (i) a multiplicative decrease control of the fair rate that is responsive to a sudden and substantial change in the queue length indicative of heavy congestions in the queue resulting from elephant flows, and otherwise, under normal operating conditions, (ii) a proportional integral control of the fair rate based on tunable control parameters (i.e., based on a proportional integral control adjustment), which also auto-tunes the control parameters, as described below.

At 402, L3FCN determines/measures queue-related quantities/parameters. For example, L3FCN (i) measures a current queue length (Qlen), (ii) computes a change in the queue length from a previous queue length (i.e., Qlen-Qold) and a direction of the change in queue length, and (iii) computes a deviation of the current queue length from a reference length (i.e., Qlen-Qref).

At 404, using the queue-related quantities determined at 402, L3FCN detects/determines whether the queue length has incurred a sudden and substantial change in length, i.e., whether there has been a "qualifying" increase in the change in length in a given (short) time period. Responsive to such a sudden and substantial change in length, L3FCN uses multiplicative decrease control to decreases a previous fair rate to the (current/new) fair rate (referred to simply as the "fair rate") quickly, in large/coarse steps. This accelerates convergence of the queue length to the reference queue length relative to using the proportional integral, which would normally be used when there has not been a sudden and substantial change in length.

For example, to detect whether the queue length has incurred the sudden and substantial change in length, L3FCN performs sequential tests to detect whether an increase in the change in length is above one or more thresholds that are each based on the reference length. L3FCN performs a first test that tests whether the current queue length is greater than (i.e., above) a multiple of the reference queue length (e.g., three times the reference queue length) and the change in queue length is also greater than the multiple of the reference queue length, i.e., the first test tests if the following condition is true:

(Qlen>3*Qref)&&(Qlen-Qold)>3*Qref.

If the first test passes/is true, then L3FCN sets the fair rate equal to a predetermined minimum rate (MIN_RATE) for the fair rate, i.e.:

fairRate=MIN_RATE.

If the first test fails, then L3FCN performs a second test that tests whether the change in the queue length is greater than the reference queue length, i.e., whether:

(Qlen-Qold)>Qref.

If the second test passes, then L3FCN uses multiplicative decrease control to derive the fair rate from the (previous) fair rate, i.e., to adjust the previous fair rate to the fair rate. For example, L3FCN sets the current fair rate equal to a fraction, less than one, of the previous fair rate, e.g.:

(current)fairRate=(previous)fairRate/2.

At 406, if the change in the length of the queue did not increase above any of the above mentioned thresholds (i.e., above at least one of the thresholds) as tested in operation 204, then the change, e.g., increase, in the length of the queue is not sudden and substantial as defined above. This corresponds to normal operating conditions for managing traffic flow (fair rate) control, i.e., when the traffic flows are under control and being sent at their fair rates responsive to feedback control messages C. Accordingly, L3FCN uses proportional integral control to derive the fair rate from the previous fair rate (i.e., to adjust the previous fair rate to the current fair rate), gradually (i.e., in fine steps), based on the tunable control parameters mentioned above, and also using the queue related parameters determined at 402. Specifically, the proportional integral control derivation/adjustment of fair rate includes, if the deviation of the length from the reference length indicates that the length is less than or above the reference length, respectively increasing or decreasing the previous fair rate by an amount that is a function of (i) a product of a first tunable control parameter A and the deviation of the length from the reference length, and (ii) a product of a second tunable control parameter B and the change in length, to produce the fair rate. That is, L3FCN may derive the fair rate from the previous fair rate (i.e., adjust the previous fair rate to the (current) fair rate) in accordance with the following proportional integral control adjustment:

(current) fairRate=(previous) fair rate−(A*(Qlen−Qref)+B*(Qlen−Qold)), where A and B represent the tunable control parameters.

In the above equation for the proportional integral control adjustment, Qold may represent simply a previously measured valued of the current queue length Qlen. In another embodiment, L3FCN may compute previous queue length Qold as a weighted average of a previous measured queue length and a current measured queue length, e.g., according to: Qold=Qold/2+Qlen/2.

In an embodiment, L3FCN computes/adjusts control parameters A and B as a function of a rate, referred to as a "LinkSpeed," at which the packets stored in the queue are being drained from the queue via one or more ports of the network device. In an example in which the queue is being drained by a single port, the LinkSpeed may be equal to a data rate (i.e., a port speed) at which the port operates. If multiple queues share a port, then the LinkSpeed for each queue will be less than the port speed. In an example, L3FCN computes control parameters A and B such that the parameters are each inversely proportional to a term "Ratio."

To compute the term "Ratio" (also referred to as a "ratio divisor") L3FCN first determines a largest integer N that satisfies the following expression (i.e., N is the largest integer that makes the following condition/expression true):

(previous) fairRate<((LinkSpeed/N)+MIN_RATE).

Then, L3FCN computes the Ratio as a value that is proportional to N, e.g., according to:

Ratio=N/2.

Then, L3FCNB performs a short queue length test, i.e., tests whether (Qlen<Qref/8 and Qold<Qref/8) is true/passes.

If the short queue length passes and if the Ratio is greater than or equal to a threshold greater than 1, L3FCN decreases the Ratio of N/2 by an integer factor greater than 1 (e.g., Ratio=Ratio/4).

On the other hand, if the short queue length test passes and if the Ratio is less than 4, L3FCN maintains the Ratio of N/2. The short queue length test and resulting operations avoid throughput loss.

Using the value for Ratio as computed above, L3FCN then computes the control parameters A and B according to equations described below in connection with FIG. 6.

At 408, L3FCN periodically identifies elephant flows among the multiple traffic flows of the queue. The network device may employ/maintain "elephant traps" that identify the heavy users/elephant flows of the queue, which may become congested as a result of the elephant flows. In an example, the elephant traps may be implemented in packet forward unit 243 or elsewhere in the network device.

At 410, L3FCN periodically sends an indication of the fair rate to a source of each elephant flow. In an embodiment, L3FCN periodically sends the fair rate only to the sources of the elephant flows, not to other sources of traffic flows. The fair rate indication may have a generic format, such as a field including multiple bits, e.g., a 16 bit field, representative of the fair rate. The multi-bit field may be used to represent a range of monotonically increasing fair rates from a minimum fair rate to a maximum fair rate. When the source (e.g., endpoint 102) of each elephant flow receives the indicated fair rate, a rate limiter (e.g., rate limiter 110) in the source imposes the indicated fair rate at the source, i.e., sets a data transmission rate for the associated flow to the indicted fair rate. In an endpoint, the rate limiter may be implemented in a network interface card (NIC). Alternatively, the rate limiter may be implemented in an ingress TOR at an edge of a data center or network 104 feeding the network device.

Figure 5:
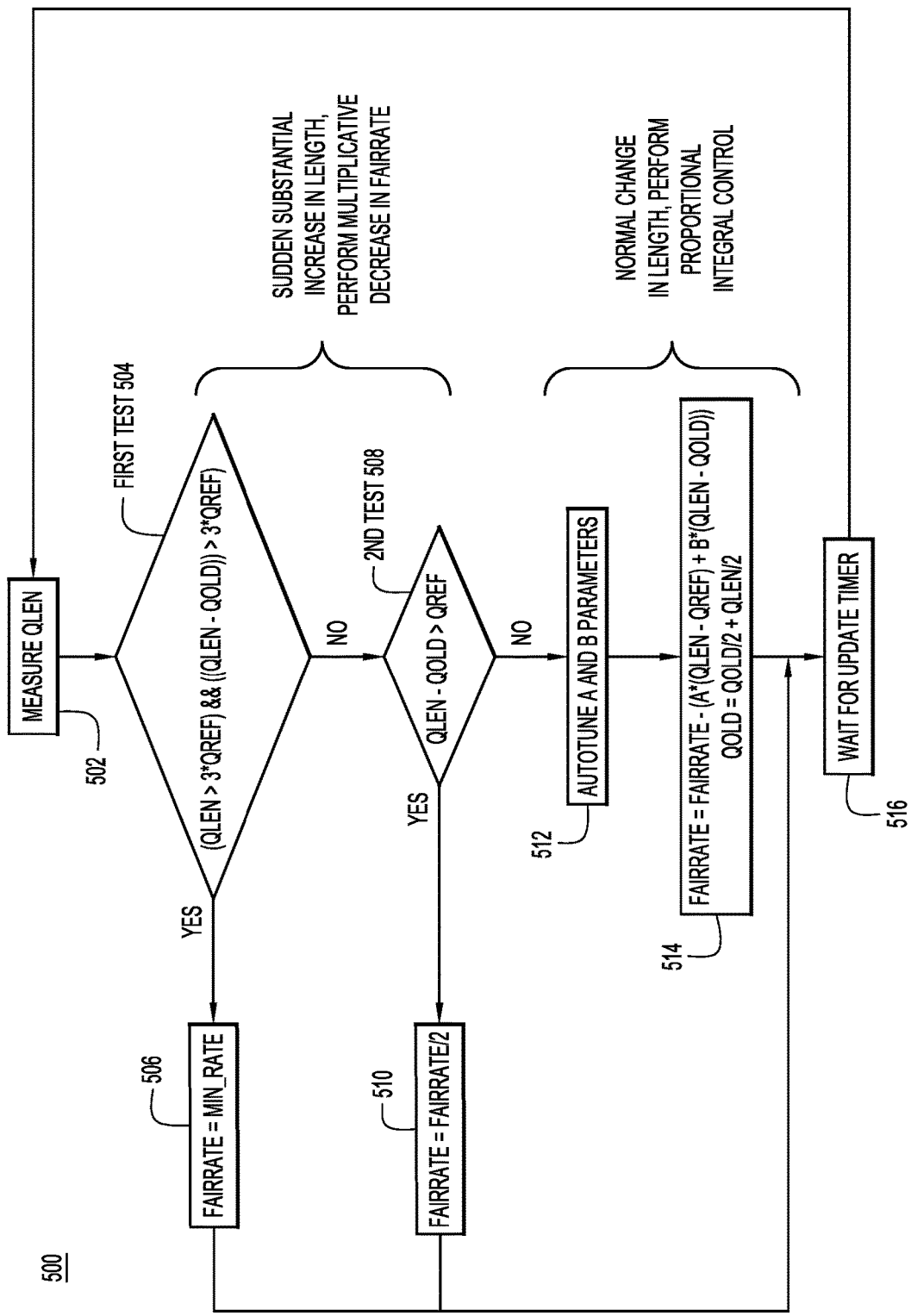
FIG. 5 is a flowchart expanding on the L3FCN method of FIG. 4, according to an example embodiment.

With reference to FIG. 5, there is a flowchart expanding on operations 402-406, i.e., of periodically deriving fair rate.

At 502, L3FCN measures the current queue length Qlen, and determines the change in length of the queue Qlen−Qold, and the deviation of the queue length from the reference queue length.

At 504, L3FCN detects whether there has been a sudden and substantial increase in the change in the queue length, e.g., whether a first test ((Qlen>3*Qref) && (Qlen−Qold)>3*Qref) passes. If the first test passes, flow proceeds to 506, where L3FCN sets the fair rate equal to MIN_RATE, and then flow returns. If the first test fails, then flow proceeds to 508.

At 508, L3FCN again detects whether there has been a sudden and substantial increase in the change in the queue length, e.g., whether a second test ((Qlen−Qold)>Qref) passes. If the second test passes, flow proceeds to 510, where L3FCN sets the current fair rate equal to the previous fair rate divided by an integer greater than 1, e.g., 2. Then flow returns. If the second test fails, flow proceeds to 512.

At 512, L3FCN auto-tunes the control parameters A and B using the operations described above in connection with method 400, and flow proceeds to 514.

At 514, L3FCN computes the fair rate according to the equation:

(current) fairRate=(previous) fair rate−($A$*(Qlen−Qref)+$B$*(Qlen−Qold)).

Flow proceeds to 516. At 516, when an update timer times-out, flow proceeds to 502. In this way, a loop comprising operations 502-514 repeats periodically over time (i.e., as time progresses). Method 500 is a method that repeatedly derives fair rate, which may be used in methods 600 and 700.

Figure 6:
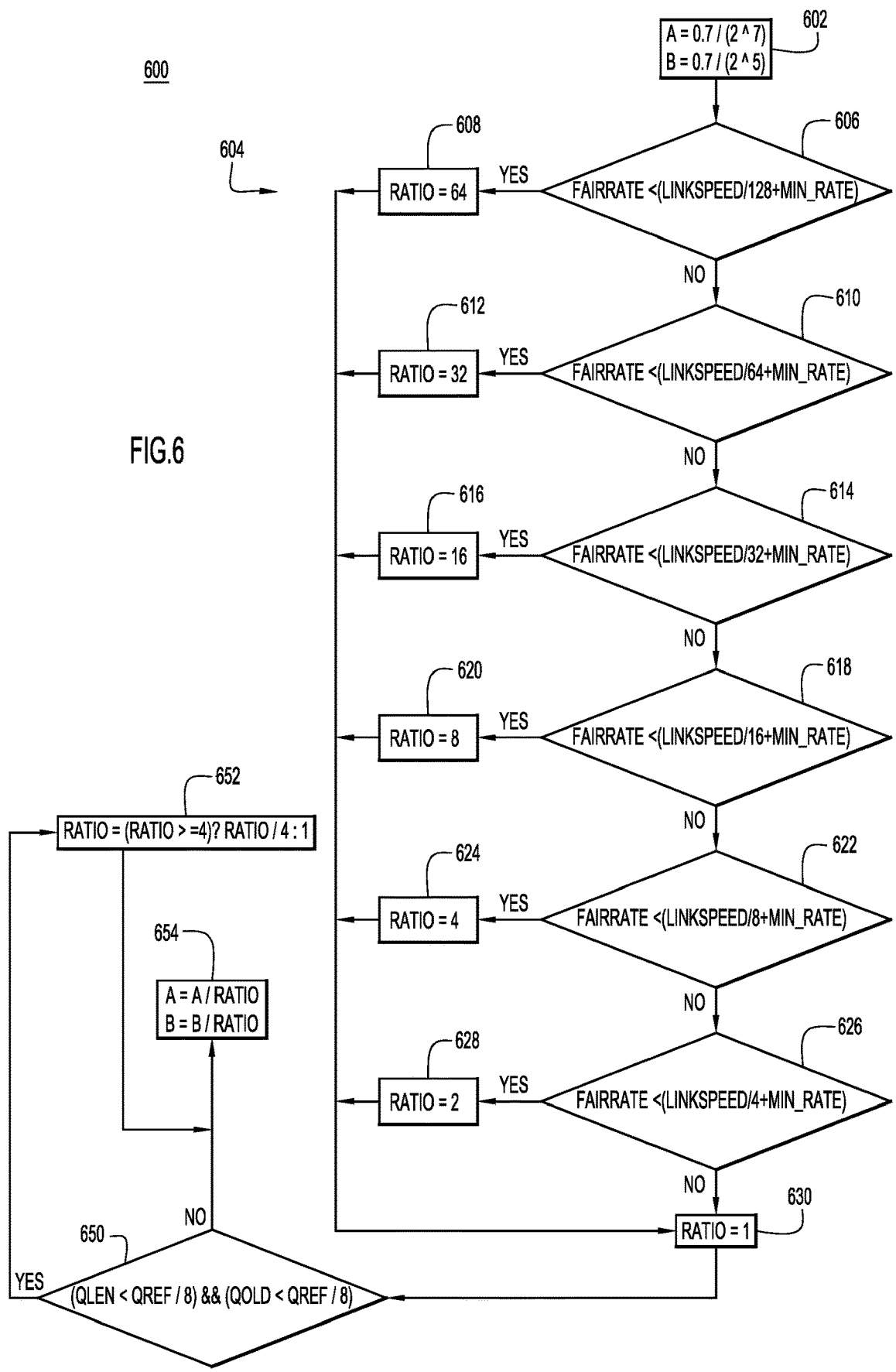
FIG. 6 is a flowchart of a method of computing tunable control parameters for integral proportional control in the L3FCN, according to an example embodiment.

With reference to FIG. 6, there is a flowchart of a method 600 of computing control parameters A and B, i.e., of auto-tuning the control parameters. Method 600 expands on operation 512 from FIG. 5.

At 602, L3FCN initializes A and B, i.e., sets A and B to initial numeric values. The initial numeric values are tunable based on LinkSpeed. For example, the initial numeric values for A and B are set equal to $0.7/2^7$ and $0.7/2^5$, respectively, for a LinkSpeed of 40 GHz, and to other initial values for different LinkSpeeds.

At 604, L3FCN iteratively tests monotonically decreasing values of an integer N to find a largest one of the values that satisfies the expression:

(previous) fair rate<((LinkSpeed/$N$)+MIN_RATE)   eq. (1)

L3FCN stops iterating when the largest value of N is found, and then sets the value of Ratio equal to N/2. For example, at 606, L3FCN sets N=128, and tests whether eq. (1) passes. If the test passes at 606, flow proceeds to 608, where L3FCN sets Ratio=N/2=64, and then flow proceeds to 650. If the test fails at 606, flow proceeds to 610. At 610, L3FCN sets N=64, and again tests whether eq. (1) passes. If the test passes at 610, flow proceeds to 612. At 612, L3FCN sets Ratio=N/2=32, and flow proceeds to 650. L3FCN continues to perform similar iterations comprising operation pairs (614, 616), (618, 620), (622, 624), and (626, 628) down the chain of decreasing values of N toward operation 628. If the test of eq. (1) has not passed by operation 628, at 630, L3FCN sets Ratio equal to 1, and flow proceeds to 650.

At 650, L3FCN performs a "short queue" test, e.g., whether the short queue test (Qlen<Qref/8 and Qold<Qref/8) passes. If the short queue test passes, flow proceeds to 652, otherwise flow proceeds to 654.

At 652, L3FCN performs the following operations:
a. If the Ratio is greater than or equal to a threshold greater than 1, L3FCN decreases the Ratio by a factor of 4, and flow proceeds to 654.
b. If the Ratio is less than 4, L3FCN maintains the Ratio at N/2, and flow proceeds to 654.

At 654, L3FCN computes the control parameters A and B such that they are each based on the Ratio (e.g., inversely proportional to the Ratio), as shown by way of example in block 654 (A=(initial value for A)/Ratio and B=(initial value for B)/Ratio).

Figure 7:
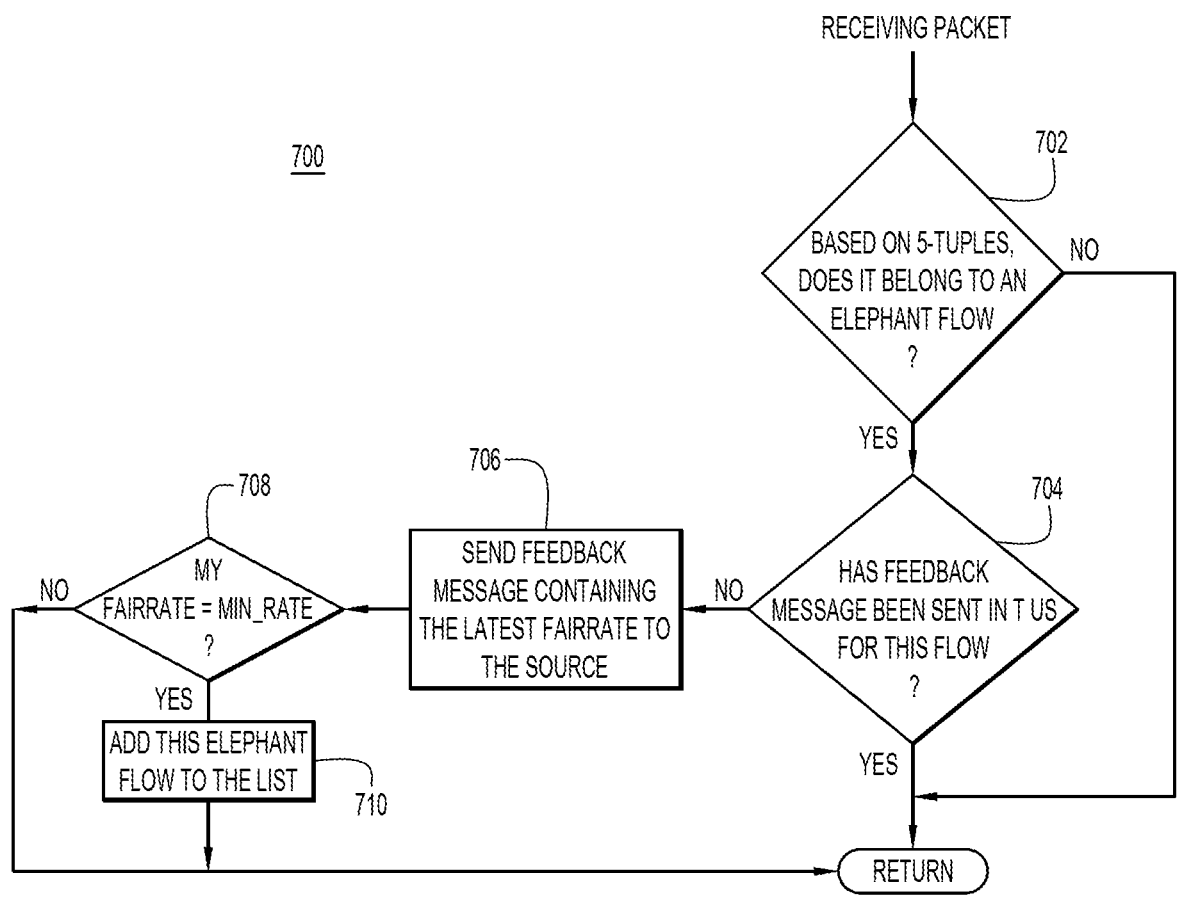
FIG. 7 is a flowchart of an L3FCN method performed each time/when a data packet of a traffic flow is received for a given queue, according to an example embodiment.
Figure 7:
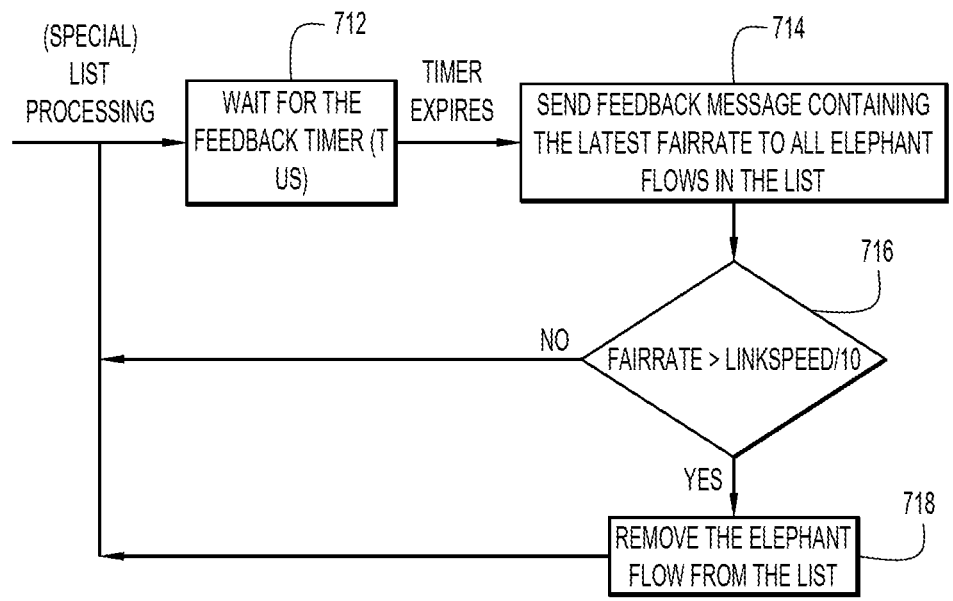

With reference to FIG. 7, there is a flowchart of an example method 700 performed when (i.e., each time) an IP packet of a traffic flow is received for a given queue (e.g., queue 300).

At 702, L3FCN determines whether the IP packet belongs to an elephant flow feeding the queue. As mentioned above, L3FCN may determine (i) to which traffic flow the IP packet belongs based on fields (e.g., a source IP address) in a 5-tuple of an IP header of the IP packet, and (ii) whether that traffic flow has exceeded a quantitative threshold indicative of an elephant flow. L3FCN maintains for each network device a list (e.g., list 304) of identities, e.g., source IP addresses (or other 5-tuple identifiers), of traffic flows that qualify as elephant flows for the network device. If the IP packet does not belong to an elephant flow in the queue, flow returns. Otherwise, flow proceeds to 704.

At 704, L3FCN determines whether L3FCN has sent a feedback message (C) including an indication of the fair rate to the source of the elephant flow identified at 702, recently, e.g., within a predetermined time period. If yes, flow returns. Otherwise, flow proceeds to 706.

At 706, L3FCN sends a feedback message (C) including the latest/current fair rate derived as describe above to the source of the elephant flow identified at 702. Flow proceeds to 708.

At 708, L3FCN determines whether the sent fair rate is equal to the MIN_RATE. If no, flow returns. Otherwise, flow proceeds to 710.

At 710, L3FCN adds the elephant flow identified at 702 to a special list (List) of special elephant flows for which the associated fair rate has been determined to be equal to the MIN_RATE.

For each of the special elephant flows that have been added to the special list of elephant at 710, at 712, L3FCN waits for a predetermined time period (e.g., in microseconds (us)) to expire. When the timer expires, flow proceeds to 714.

At 714, L3FCN sends a feedback message (C) including the latest/current fair rate to all of the elephant flows on the special list, and flow proceeds to 716.

At 716, L3FCN determines whether the fair rate>the LinkSpeed divided by an integer greater than 1, e.g., 10. If no, flow returns to 712, otherwise flow proceeds to 718.

At 718, the elephant flow most recently added to the special list is removed from the special list.

In method 700, operations 702-710 represent packet-driven feedback in which, upon arrival of a packet of an elephant flow, a feedback message indicating the current fair rate is sent to traffic source of the elephant flow if at least T microseconds has passed since the previous feedback message was sent. Period T is variable, e.g., 10 us during a transition time and 40 us during a steady state condition. On the other hand, operations 712-718 represent timer-driven feedback in which feedback messages indicating the current fair rate for elephant flows on the special list with fair rates=MIN_RATE are sent every T us, because the packets for these flows do not arrive often; once their fair rates rise above a certain threshold, the elephant flows on the special list are removed from the special list.

Figure 8:
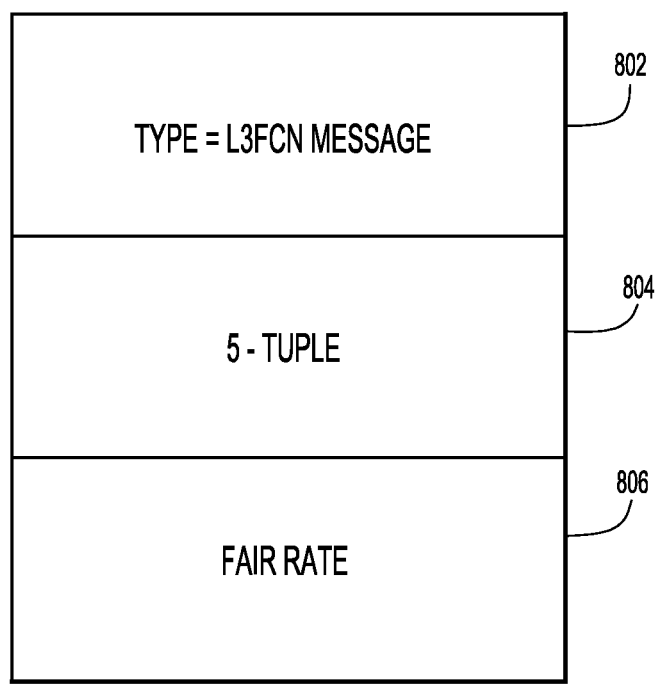
FIG. 8 is an illustration of a format for a fair rate message, according to an example embodiment.

With reference to FIG. 8, there is an illustration of an example fair rate message 800 representative of fair rate messages C of FIG. 1, including a type field 802 to indicate that the message is a fair rate message, a 5-tuple 804 similar to a 5-tuple in a header of an IP packet that conveys source and destination address information, and a fair rate field 806 conveying a multi-bit value for a fair rate.

In summary, L3FCN improves upon conventional data center QCN (DCQCN) congestion control, which disadvantageously uses only single-bit explicit congestion control (ECN) marking to help sources cut their transmission data rates. Using direct, multi-bit rate feedback (i.e., fair rate indications) to the traffic sources and multiplicative decrease under heavy congestion, L3FCN converges much faster than DCQCN and can handle a larger number of elephant flows. L3FCN is also more stable and can achieve full link utilization while DCQCN tends to be less stable and loses throughput.

L3FCN adopts a straight forward trap to capture elephant flows so that the fair rate can be sent to sources of the elephant flows. In this way, mice flows that are not causing the congestion remain unaffected, sending of unnecessary feedback messages to the mice flows is reduced, and wasting rate limiters at NICs or ingress TORs is avoided.

In one form, a method is provided comprising: at a network switch or router having multiple ports configured to receive/send data packets from/to a network, receiving data packets of multiple traffic flows and populating a queue in a memory of the network switch or router with the data packets; periodically updating a fair rate to be applied to ones of the multiple traffic flows to converge a length of the queue to a reference length over time, the updating including: measuring a length of the queue, computing a change in the length from a previous length, and computing a deviation of the length from the reference length; detecting an increase in the change in length above at least one threshold that is based on the reference length; and if the increase is not above the at least one threshold, deriving the fair rate from a previous fair rate using proportional integral control based on tunable control parameters; periodically identifying elephant flows among the multiple traffic flows; and periodically sending the fair rate to a source of each elephant flow.

In another form, an apparatus is provided comprising: multiple ports configured to receive/send data packets from/to a network; and a processor coupled to the ports and configured to: receive data packets of multiple traffic flows and populate a queue with the data packets; periodically update a fair rate to be applied to ones of the multiple traffic flows to converge a length of the queue to a reference length over time such that the processor is configured to: measure a length of the queue, compute a change in the length from a previous length, and compute a deviation of the length from the reference length; detect an increase in the change in length above at least one threshold that is based on the reference length; and if the increase is not above the at least one threshold, derive the fair rate from a previous fair rate using proportional integral control based on tunable control parameters; periodically identify elephant flows among the multiple traffic flows; and periodically send the fair rate to a source of each elephant flow.

In yet another form, computer readable media is provided. The computer readable media is encoded with instructions that, when executed by a processor, perform: receiving data packets of multiple traffic flows and populating a queue in memory with the data packets; periodically updating a fair rate to be applied to ones of the multiple traffic flows to converge a length of the queue to a reference length over time, the updating including: measuring a length of the queue, computing a change in the length from a previous length, and computing a deviation of the length from the reference length; detecting an increase in the change in length above at least one threshold that is based on the reference length; and if the increase is not above the at least one threshold, deriving the fair rate from a previous fair rate using proportional integral control based on tunable control parameters; periodically identifying elephant flows among the multiple traffic flows; and periodically sending the fair rate to a source of each elephant flow.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network switch or router having multiple ports configured to receive/send data packets from/to a network, receiving data packets of multiple traffic flows and populating a queue in a memory of the network switch or router with the data packets;
   periodically updating a fair rate to be applied to ones of the multiple traffic flows to converge a length of the queue to a reference length over time, the updating including:
      measuring a length of the queue, computing a change in the length of the queue from a previous length, and computing a deviation of the length of the queue from the reference length;
      detecting an increase in the change in the length of the queue above at least one threshold that is based on the reference length; and
      if the increase is not above the at least one threshold, and if the deviation of the length of the queue from the reference length indicates that the length of the queue is less than or above the reference length, deriving the fair rate from a previous fair rate using proportional integral control based on tunable control parameters by respectively increasing or decreasing the previous fair rate by an amount that is equal to a sum of (i) a product of a first tunable control parameter and the deviation of the length of the queue from the reference length, and (ii) a product of a second tunable control parameter and the change in the length of the queue from the previous length of the queue, to produce the fair rate;

periodically identifying elephant flows among the multiple traffic flows; and periodically sending the fair rate to a source of each elephant flow.

2. The method of claim 1, further comprising:

if the increase is above the at least one threshold, the updating includes decreasing the previous fair rate to the fair rate using multiplicative decrease control to accelerate convergence relative to the using the proportional integral control based on the tunable control parameters.

3. The method of claim 2, wherein:

the detecting the increase in the change in the length above the at least one threshold includes testing whether the increase is above a first threshold;

if the increase is above the first threshold, the decreasing includes setting the fair rate equal to a predetermined minimum rate for the fair rate;

if the increase is not above the first threshold, the detecting includes testing whether the increase is above a second threshold that is below the first threshold; and if the increase is above the second threshold but not above the first threshold, the decreasing includes setting the fair rate equal to a fraction, less than one, of the previous fair rate.

4. The method of claim 3, wherein:

the testing whether the increase is above the first threshold includes testing whether the length is greater than a multiple of the reference length and the change in the length is above the first threshold, wherein the first threshold is based on the reference length; and the testing whether the increase is above the second threshold includes testing whether only the length exceeds the second threshold, wherein the second threshold is based on the reference length.

5. The method of claim 1, wherein the fair rate is in a range of monotonically increasing fair rates from a minimum fair rate to a maximum fair rate.

6. The method of claim 1, wherein the deriving the fair rate includes deriving the fair rate according to a function given by:

$A*(Qlen-Qref)+B*(Qlen-Qold),$ where:

Qlen is the length of the queue;

Qold is the previous length of the queue, such that (Qlen-Qold) is the change in the length of the queue;

Qref is the reference length, such that (Qlen-Qref) is the deviation in the length of the queue; and A and B are the first tunable control parameter and the second tunable control parameter, respectively.

7. The method of claim 1, wherein the deriving further includes tuning the first tunable control parameter and the second tunable control parameter as a function of a known link speed at which data packets stored to the queue are drained from the queue via one or more of the multiple ports.

8. The method of claim 7, wherein the tuning includes:

determining a largest integer N that satisfies an expression given by: the previous fair rate <((link speed/N) +a predetermined minimum rate for the fair rate);

computing a ratio divisor that is proportional to the largest integer N; and computing the first tunable control parameter and the second tunable control parameter such that each tunable control parameter is inversely proportional to the ratio divisor.

9. The method of claim 8, wherein the computing the ratio divisor includes:

setting the ratio divisor equal to a largest integer N/2;

performing a short queue test to test whether the length and the previous length are both below a predetermined fraction of the reference length;

if the short queue test passes:

if the ratio divisor is greater than or equal to a threshold greater than 1, decreasing the ratio divisor by an integer factor greater than 1; and if the ratio divisor is less than 4, maintaining the ratio divisor.

10. The method of claim 1, further comprising:

classifying each data packet into a respective traffic flow based on a 5-tupe in a header of the data packet, such that data packets that originate from a same source are classified into a same traffic flow, wherein the identifying includes identifying as an elephant flow each traffic flow for which a number of the data packets classified into that traffic flow exceeds a threshold number of data packets.

11. The method of claim 1, wherein the periodically sending the fair rate to the source of each elephant flow includes, for each data packet that is received:

determining if the data packet belongs to an elephant flow; and if the data packet belongs to an elephant flow, sending the fair rate to the source if the fair rate was not previously sent to the source within a predetermined time period.

12. The method of claim 11, further comprising:

maintaining a list of elephant flows for which the sending includes sending a predetermined minimum rate for the fair rate;

periodically sending the fair rate to sources of the elephant flows on the list independently of receiving the data packets; and removing each elephant flow from the list for which the periodically sending the fair rate to the sources of the elephant flows on the list includes sending as the fair rate a fair rate that is greater than a threshold fair rate.

13. An apparatus comprising:

multiple ports configured to receive/send data packets from/to a network; and a processor coupled to the ports and configured to:

receive data packets of multiple traffic flows and populate a queue with the data packets;

periodically update a fair rate to be applied to ones of the multiple traffic flows to converge a length of the queue to a reference length over time such that the processor is configured to:

measure a length of the queue, compute a change in the length from a previous length, and compute a deviation of the length from the reference length;

detect an increase in the change in the length above at least one threshold that is based on the reference length; and if the increase is not above the at least one threshold, and if the deviation of the length of the queue from the reference length indicates that the length of the queue is less than or above the reference length, derive the fair rate from a previous fair rate using proportional integral control based on tunable control parameters by respectively increasing or decreasing the previous fair rate by an amount that is equal to a sum of (i) a product of a first tunable control parameter and the deviation of the length of the queue from the reference length, and (ii) a product of a second tunable control parameter and the change in the length of the queue from the previous length of the queue, to produce the fair rate;

periodically identify elephant flows among the multiple traffic flows; and periodically send the fair rate to a source of each elephant flow.

14. The apparatus of claim 13, wherein the processor is further configured to:

if the increase is above the at least one threshold, decrease the previous fair rate to the fair rate using multiplicative decrease control to accelerate convergence relative to the using the proportional integral control based on the tunable control parameters.

15. The apparatus of claim 14, wherein the processor is further configured to:

detect the increase in the change in the length above the at least one threshold by testing whether the increase is above a first threshold;

if the increase is above the first threshold, decrease the previous fair rate by setting the fair rate equal to a predetermined minimum rate for the fair rate;

if the increase is not above the first threshold, test whether the increase is above a second threshold that is below the first threshold; and if the increase is above the second threshold but not above the first threshold, set the fair rate equal to a fraction, less than one, of the previous fair rate.

16. The apparatus of claim 13, wherein the fair rate is in a range of monotonically increasing fair rates from a minimum fair rate to a maximum fair rate.

17. The apparatus of claim 13, wherein the processor is further configured to:

classify each data packet into a respective traffic flow based on a 5-tupe in a header of the data packet, such that data packets that originate from a same source are classified into a same traffic flow, wherein the processor is configured to identify by identifying as an elephant flow each traffic flow for which a number of the data packets classified into that traffic flow exceeds a threshold number of data packets.

18. A non-transitory computer readable medium encoded with instructions that, when executed by a processor of a network switch or router having multiple ports configured to receive/send data packets from/to a network, cause the processor to perform:

receiving data packets of multiple traffic flows and populating a queue in memory with the data packets;

periodically updating a fair rate to be applied to ones of the multiple traffic flows to converge a length of the queue to a reference length over time, the updating including:

measuring a length of the queue, computing a change in the length from a previous length, and computing a deviation of the length from the reference length;

detecting an increase in the change in the length above at least one threshold that is based on the reference length; and if the increase is not above the at least one threshold, and if the deviation of the length of the queue from the reference length indicates that the length of the queue is less than or above the reference length, deriving the fair rate from a previous fair rate using proportional integral control based on tunable control parameters by respectively increasing or decreasing the previous fair rate by an amount that is equal to a sum of (i) a product of a first tunable control parameter and the deviation of the length of the queue from the reference length, and (ii) a product of a second tunable control parameter and the change in the length of the queue from the previous length of the queue, to produce the fair rate;

periodically identifying elephant flows among the multiple traffic flows; and periodically sending the fair rate to a source of each elephant flow.

19. The non-transitory computer readable medium of claim 18, further comprising instructions to cause the processor to perform:

if the increase is above the at least one threshold, the updating includes decreasing the previous fair rate to the fair rate using multiplicative decrease control to accelerate convergence relative to the using the proportional integral control based on the tunable control parameters.

20. The non-transitory computer readable medium of claim 18, wherein the fair rate is in a range of monotonically increasing fair rates from a minimum fair rate to a maximum fair rate.

* * * * *